(12) United States Patent
Tomonaga et al.

(10) Patent No.: US 8,737,467 B2
(45) Date of Patent: May 27, 2014

(54) INFORMATION PROCESSING APPARATUS AND METHOD

(75) Inventors: Ken Tomonaga, Kanagawa (JP); Toshio Takada, Tokyo (JP)

(73) Assignee: Sony Corporation, Tokyo (JP)

( * ) Notice: Subject to any disclaimer, the term of this patent is extended or adjusted under 35 U.S.C. 154(b) by 420 days.

(21) Appl. No.: 12/783,846

(22) Filed: May 20, 2010

(65) Prior Publication Data

US 2010/0303369 A1 Dec. 2, 2010

(30) Foreign Application Priority Data

May 27, 2009 (JP) ................................ P2009-127244

(51) Int. Cl.
*H04N 7/12* (2006.01)
*H04N 11/02* (2006.01)
*H04N 11/04* (2006.01)

(52) U.S. Cl.
USPC ...................................................... 375/240.1

(58) Field of Classification Search
USPC .......................... 375/240.01–240.27; 710/35
See application file for complete search history.

(56) References Cited

U.S. PATENT DOCUMENTS

| | | | | |
|---|---|---|---|---|
| 6,647,061 B1* | 11/2003 | Panusopone et al. | ..... | 375/240.12 |
| 6,750,909 B1* | 6/2004 | Tsai | ............................ | 348/231.2 |
| 7,865,581 B2* | 1/2011 | Straub et al. | ................... | 709/221 |
| 8,213,518 B1* | 7/2012 | Wang et al. | ............... | 375/240.25 |
| 8,442,119 B2* | 5/2013 | Misuda | ..................... | 375/240.24 |
| 2004/0114690 A1* | 6/2004 | Gordon et al. | ............ | 375/240.25 |
| 2008/0044090 A1* | 2/2008 | Wakasa | .......................... | 382/234 |
| 2008/0056381 A1* | 3/2008 | Sung et al. | ................ | 375/240.26 |
| 2008/0317134 A1* | 12/2008 | Zhou | .......................... | 375/240.25 |

FOREIGN PATENT DOCUMENTS

| | | |
|---|---|---|
| JP | 11-331840 | 11/1999 |
| JP | 2001-292450 | 10/2001 |
| JP | 2003-319389 | 11/2003 |

* cited by examiner

*Primary Examiner* — Andy Rao
*Assistant Examiner* — Jared Walker
(74) *Attorney, Agent, or Firm* — Frommer Lawrence & Haug LLP; William S. Frommer; Ellen Marcie Emas

(57) ABSTRACT

An information processing apparatus includes: an analysis means for analyzing a code stream in which picture data is encoded during transmission; a dividing position determination means for determining a dividing position of the code stream in accordance with a picture size of the picture data based on an analysis result by the analysis means; and a decoding means for decoding code streams in plural units of division in parallel, which are obtained by the code stream being divided at the dividing position determined by the dividing position determination means.

7 Claims, 10 Drawing Sheets

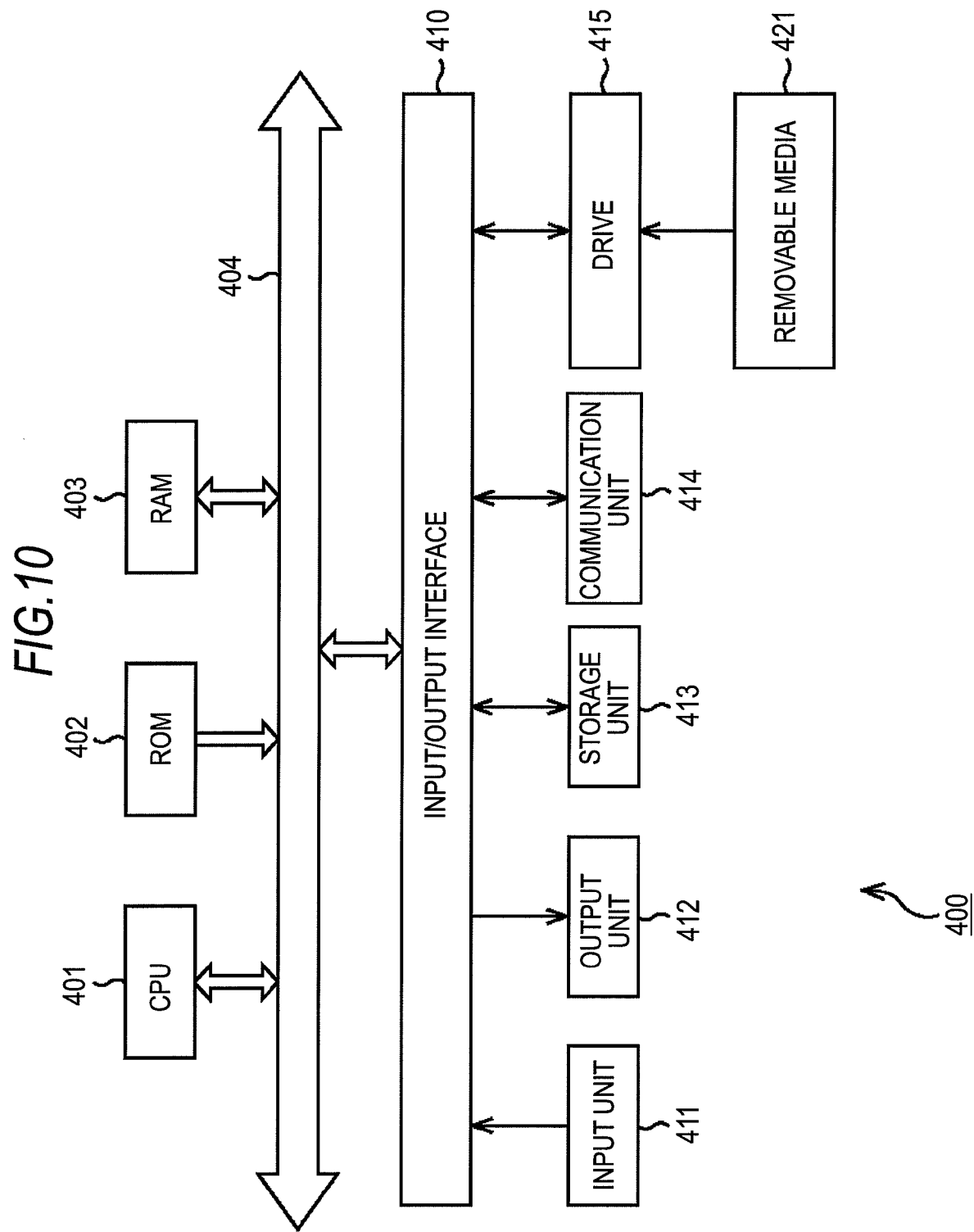

INFORMATION PROCESSING APPARATUS AND METHOD

BACKGROUND OF THE INVENTION

1. Field of the Invention

The present invention relates to an information processing apparatus and a method thereof, and particularly relates to an information processing apparatus and a method capable of further reducing latency of decoding processing.

2. Description of the Related Art

In related art, there is a decoder decoding an encoded stream obtained by encoding video by an encoding format called as MPEG (Moving Picture Experts Group). In the MPEG series which have been standardized, MPEG2 is common. Recently, compression encoding formats such as MPEG4 or AVC (Advanced Video Coding) in which compression ratio has been increased have been standardized.

When the encoded stream is decoded in a personal computer, for example, there is a method of decoding the stream by using a decoder configured by hardware which is added on the personal computer by, for example, an expansion board.

In such case, the personal computer supplies an encoded stream to the decoder when it becomes necessary to decode the encoded stream. The decoder decodes the encoded stream when receiving the stream from the personal computer, and returns base-band data to the personal computer. Therefore, there is a problem that the whole processing time executed by the personal computer is increased when the latency from the supply of the encoded stream to the decoder by the personal computer until acquisition of the encoded result.

Particularly, a codec I/F of an application software performing common conversion and effects normally performs decoding frame by frame, therefore, the latency of the whole moving picture data is further increased.

For example, in a field of dealing with non-compression video such as in movie production, there is a tendency that video is high definition such as 4k, x2k, and the encoding of data is becoming more important.

SUMMARY OF THE INVENTION

However, when the latency of decoding processing is increased, the edit time may be increased and there is a possibility that it will realistically difficult to edit data.

Though there exists a method for performing decoding with lower latency in MPEG2, the latency is still large as MPEG2 applies inter-frame compression. There exists MPEG4 Simple Studio Profile (hereinafter, referred to as SStP) which is intra-frame compression having high compression ratio (for example, refer to JP-A-2001-292450 (Patent Document 1).

However, there has been no method of performing decoding processing with low latency by using MPEG4 SStP. For example, though there is a portion indicating the start of a line in a stream in MPEG2, this portion does not exist in MPEG4, therefore, it is difficult to apply the related-art method.

In view of the above, it is desirable to reduce the latency in decoding processing.

According to an embodiment of the invention, there is provided an information processing apparatus including an analysis means for analyzing a code stream in which picture data is encoded during transmission, a dividing position determination means for determining a dividing position of the code stream in accordance with a picture size of the picture data based on an analysis result by the analysis means, and a decoding means for decoding code streams in plural units of division in parallel, which are obtained by the code stream being divided at the dividing position determined by the dividing position determination means.

The analysis means can specify one line of video in the picture data by analyzing the code stream, and the dividing position determination means can determine the dividing position by using one line or plural lines of video in the picture data as a unit.

The analysis means can detect a slice start code of the code stream, and specify one line by searching a macro block at the head of the line based on a macro-block number just after the slice start code, and the dividing position determination means can determine the dividing position based on the number of macro-block lines.

An acquisition means for acquiring the code stream and a storage means for storing the code stream acquired by the acquisition means may be further included, in which the analysis means can analyze the code stream acquired by the acquisition means while storing the code stream in the storage means.

The dividing position determination means can determine the dividing position corresponding to a burst boundary in the storage means.

A control means for supplying results of decoding processing by the decoding means to the storage means by a burst transfer to be stored therein and an output means for reading the results of decoding processing stored by the storage means from the storage means by the burst transfer and outputting the results may be further included.

According to another embodiment of the invention, there is provided a method including the steps of analyzing a code stream in which picture data is encoded by an analysis means during transmission, determining a dividing position of the code stream in accordance with a picture size of the picture data based on an analysis result by a dividing position determination means and decoding code streams in plural units of division in parallel, which are obtained by the code stream being divided at the dividing position determined by a decoding means.

According to the embodiment, the code stream in which picture data is encoded is analyzed during transmission, the dividing position of the code stream is determined in accordance with the picture size of picture data based on an analysis result, and the code streams in plural units of division obtained by the code stream being divided at the dividing position are decoded in parallel.

According to the embodiments of the invention, information can be processed. Particularly, the latency of decoding processing can be further reduced.

BRIEF DESCRIPTION OF THE DRAWINGS

FIG. 10 is a block diagram showing a major configuration example of a personal computer to which an embodiment of the invention is applied.

DESCRIPTION OF THE PREFERRED EMBODIMENTS

Hereinafter, best modes for carrying out the invention (referred to as embodiments in the following description) will be explained. The explanation will be made in the following order.

1. First Embodiment (low latency decoding processing)
2. Second Embodiment (personal computer)

1. First Embodiment

[Configuration of a Device]

Figure 1:
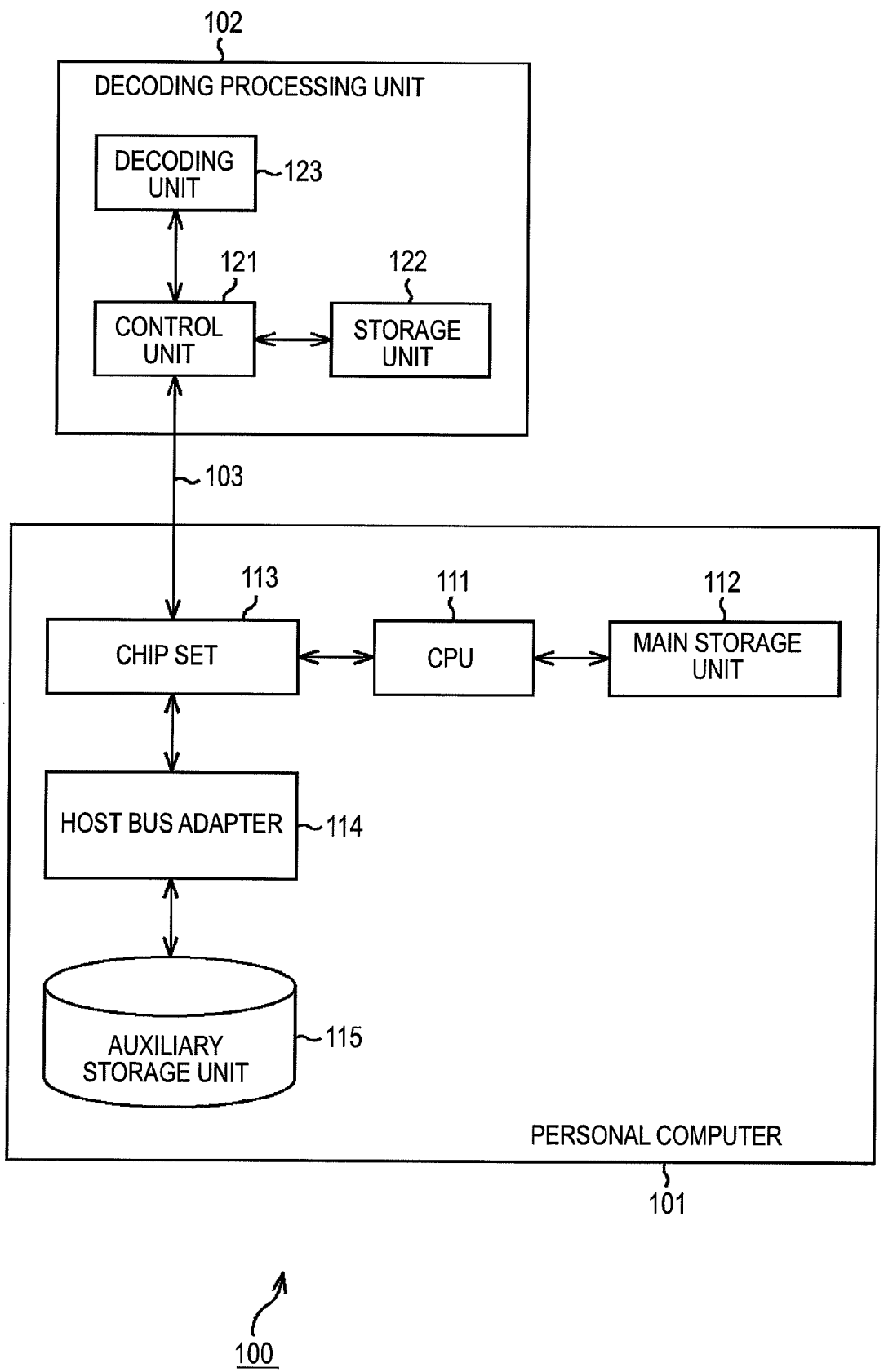
FIG. 1 is a block diagram showing a configuration example of an information processing system to which an embodiment of the invention is applied.

FIG. 1 is a block diagram showing a configuration example of an information processing system to which an embodiment of the invention is applied.

An information processing system 100 shown in FIG. 1 is a system in which a personal computer 101 supplies a code stream obtained by encoding picture data to a decoding processing unit 102 through a bus 103 to be decoded therein and acquires a decoded result through the bus 103.

The code stream is the stream in which picture data is encoded by MPEG4 Simple Studio Profile (hereinafter, referred to as SStP). That is, the decoding processing unit 102 decodes the code stream by the MPEG4 SStP format which is the intra-frame compression with low latency.

The personal computer 101 includes a CPU (Central Processing Unit) 111, a main storage unit 112, a chip set 113, a host bus adapter 114 and an auxiliary storage unit 115.

The CPU 111 reads programs and data stored in the auxiliary storage unit 115 and loads them to the main storage unit 112 to be executed, where calculation and control processing are performed. The main storage unit 112 includes a semiconductor memory such as a DRAM (Dynamic Random Access Memory) and the like, temporarily storing various information.

The chip set 113 performs processing of bus interface and the like for the CPU 111. The host bus adapter 114 is an interface of a bus to which storage media such as the auxiliary storage unit 115, drives and the like are connected. The auxiliary storage unit 115 is, for example, a large capacity storage medium including a hard disc, a flash memory and the like.

The decoding processing unit 102 includes a control unit 121, a storage unit 122 and a decoding unit 123. The control unit 121 includes, for example, a CPU and the like, controlling respective units of the decoding processing unit 102. The storage unit 122 includes, for example, a semiconductor memory and the like such as a DRAM, temporarily storing various information. The decoding unit 123 decodes encoded data in the MPEG4 SStP format, performing decoding processing for obtaining moving picture data.

The auxiliary storage unit 115 of the personal computer 101 stores the code stream obtained by encoding moving picture data in the MPEG4 SStP format. The CPU 111 reads the code stream from the auxiliary storage unit 115 through the chip set 113 and the host bus adapter 114, storing the code stream in the main storage unit 112.

The CPU 111 reads the code stream stored in the main storage unit 112 and supplies the code stream to the decoding processing unit 102 through the chip set 113 and the bus 103.

The control unit 121 of the decoding processing unit 102 acquires the code stream and temporarily stores the stream in the storage unit 122.

The control unit 121 reads the code stream from the storage unit 122 at a predetermined timing and supplies the code stream to the decoding unit 123 to be decoded there. When the control unit 121 obtains picture data of a decoded result from the decoding unit 123, the control unit 121 temporarily stores the data in the storage unit 122. The control unit 121 reads moving picture data from the storage unit 122 at a predetermined timing and supplies the data to the personal computer 101 through the bus 103.

When the CPU 111 of the personal computer 101 acquires the moving picture data through the chip set 113, the CPU 111 stores the data in the main storage unit 112 and reads the data according to need to perform conversion processing, picture processing and the like. The CPU 111 also supplies moving picture data stored in the main storage unit 112 to the auxiliary storage unit 115 according to need to be stored therein.

In the field of dealing with non-compression video such as in movie production, there is a tendency that video is high definition such as 4k, x2k, and a transfer band of the auxiliary storage unit 115 is insufficient, therefore, it is necessary to use compression. However, edit time will be enormous and it becomes difficult to execute compression unless the latency (delay time) of decoding processing in the decoding processing unit 102 is reduced.

The latency is too large in MPEG2 because of the inter-frame compression. Therefore, the personal computer 101 uses MPEG4 SStP which is the intra-frame compression having high compression ratio. Here, the decoding unit 123 can execute plural decoding processing in parallel.

The control unit 121 divides the code stream by a given unit of data for reducing the latency and allows the decoding unit 123 to decode respective streams in parallel.

In the case of MPEG4 SStP, there does not exist a line indicating the start of a line in the code stream, therefore, it is difficult to apply the method used for MPEG2.

Results obtained by decoding the divided code streams by respective codecs are temporarily stored in the storage unit 122 and read at a predetermined timing to be transferred to the personal computer 101. At this time, it is desirable that input/output of data to the storage unit 122 is performed by burst transfer. For that purpose, it is necessary that the data amount of picture data in each unit of division corresponds to a burst boundary of the storage unit 122. It is difficult to perform the burst transfer unless the data amount of picture data in the unit of division corresponds to the burst boundary, therefore, it is likely that the latency is increased instead.

Accordingly, the control unit 121 of the decoding processing unit 102 detects the start of a line from the code stream of MPEG4 SStP, determining the divided position of the code stream by using the line as a unit. The control unit 121 determines the divided position of the code stream while considering the burst boundary.

Figure 2:
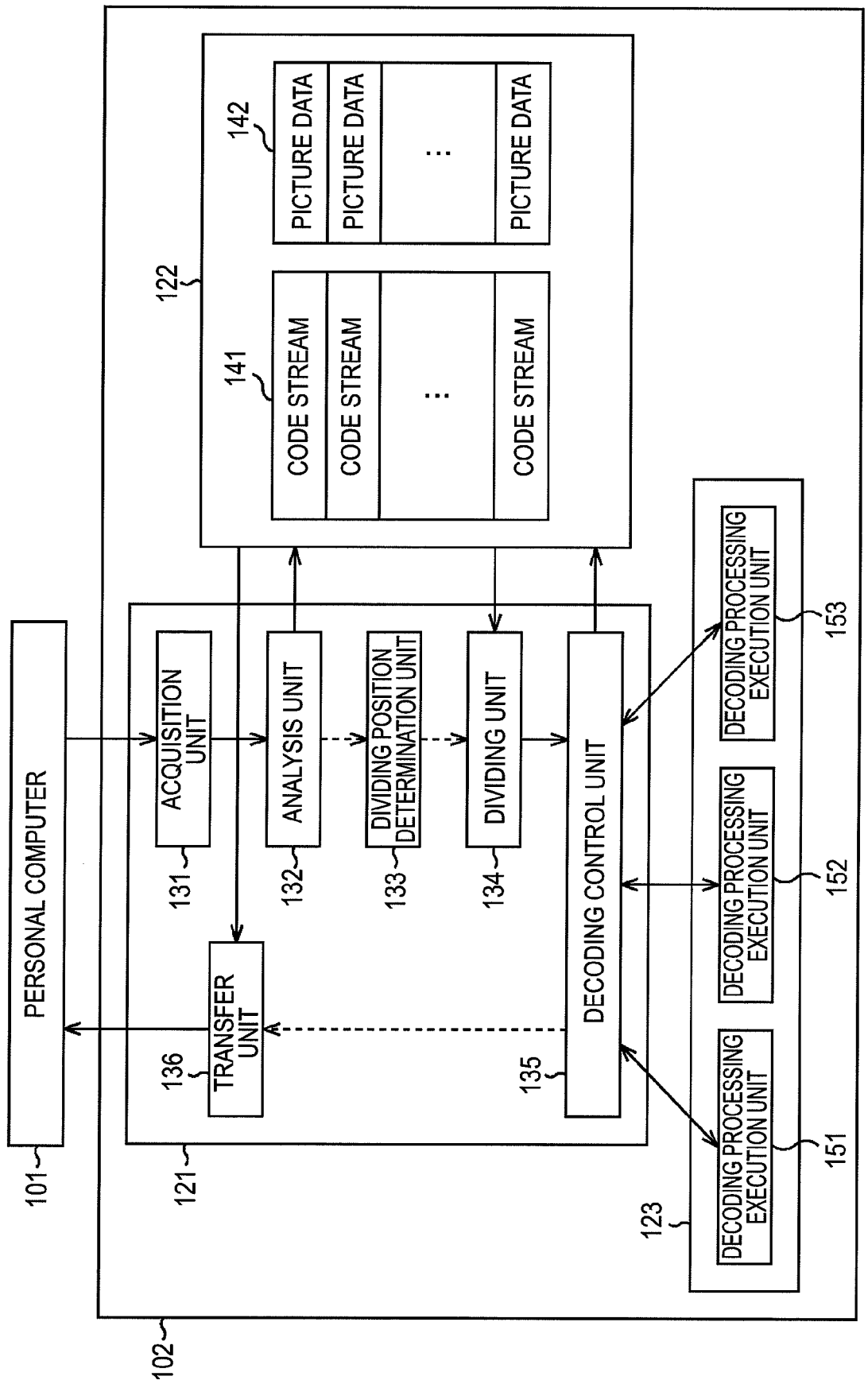
FIG. 2 is a block diagram showing a detailed configuration example of a decoding processing unit of FIG. 1.

FIG. 2 is a block diagram showing a detailed configuration example of the decoding processing unit of FIG. 1.

As shown in FIG. 2, the control unit 121 of the decoding processing unit 102 includes an acquisition unit 131, an analysis unit 132, a dividing position determination unit 133, a dividing unit 134, a decoding control unit 135 and a transfer unit 136. The acquisition unit 131 acquires a code stream supplied from the personal computer 101, supplying the code stream to the analysis unit 132.

The analysis unit 132 analyzes the code stream to obtain various information, for example, picture size information indicating the picture size of video of the code stream and macro-block information including information of positions and the size of the macro blocks, and notifies the information to the dividing position determination unit 133. The analysis unit 132 also specifies the head position of a line based on sizes of video and the macro block and notifies the position to the dividing position determination unit 133. The analysis unit 132 performs analysis while storing the code stream in the storage unit 122. That is, the analysis unit 132 performs analysis during the transmission of the code stream. Therefore, the analysis unit 132 can suppress the increase of the latency by the analysis processing.

The dividing position determination unit 133 determines a dividing position (the size of a unit of division) of the code stream based on various information supplied from the analysis unit 132. At this time, the dividing position determination unit 133 determines the dividing position while further considering the burst boundary of the storage unit 122. The dividing position determination unit 133 notifies the dividing unit 134 of the determined divided position (unit of division).

The dividing unit 134 reads the code stream from the storage unit 122 by each unit of division (reads the stream by dividing the stream at the dividing positions) based on information supplied from the dividing position determination unit 133. The dividing unit 134 sequentially supplies the read code streams to the decoding control unit 135.

The decoding control unit 135 allocates the code streams in units of division read by the dividing unit 134 to decoding processing execution units 151 to 153 in the decoding unit 123 to allow them to decode the code streams to obtain respective decoded results. The decoding control unit 135 stores the decoded results from respective decoding processing execution units in given addresses of the storage unit 122 in a state of being aligned. The decoding control unit 135 notifies the transfer unit 136 of the storage of decoded results into the storage unit 122.

The transfer unit 136 reads picture data which is decoded results from the storage unit 122 by each unit of division and transfers the data to the personal computer 101.

The storage unit 122 includes a region 141 in which code streams supplied from the personal computer 101 are stored and a region 142 in which picture data as decoded results supplied from the decoding control unit 135 is stored. As shown in FIG. 2, code streams supplied from the personal computer 101 are stored in the region 141 in a state of being aligned in the supplied order. Also, picture data supplied form the decoding unit 123 is stored in the region 142 in a state of being aligned in the same order before the division. That is, when the transfer unit 136 reads respective picture data from the region 142 in the order of addresses, picture data in units of division is synthesized with one another.

The decoding unit 123 includes the decoding processing execution units 151 to 153. The decoding processing execution units 151 to 153 decode code streams in the MPEG4 SStP format. The decoding processing execution units 151 to 153 can execute decoding processing in a parallel manner with one another (in parallel).

Here, "in a parallel manner" or "in parallel" means that decoding processing execution periods in respective decoding processing execution units overlap. For example, there is a case in which decoding processing is executed in plural decoding processing execution units at a certain timing. That is, timings of start and end of decoding processing in respective decoding processing execution units do not always correspond to one another.

Since three decoding processing at the maximum can be executed in parallel, the decoding unit 123 has processing ability of three times as much as that of one decoding processing execution unit at the maximum. Therefore, the decoding unit 123 is capable of performing decoding processing with lower latency. The number of decoding processing execution units included in the decoding unit 123 is an optional, and two or less units as well as four or more units are preferably installed. The decoding processing ability of the decoding unit 123 is preferably higher (it is desirable that the unit operates faster or the unit can execute more decoding processing in parallel).

It is also preferable that the decoding unit 123 is configured as a unit (separated body) different from the control unit 121. Needless to say, it is not necessary that respective decoding processing execution units are configured in the same unit.

[Processing Flow]

Next, various processing executed by the decoding processing unit 102 having the above configuration will be explained. When the code stream is supplied from the personal computer 101, the control unit 121 of the decoding processing unit 102 executes acquisition processing of the code stream and stores the code stream in the storage unit 122 as described above.

An example of the flow of code stream acquisition processing will be explained with reference to a flowchart of FIG. 3.

When the code stream acquisition processing is started, the acquisition unit 131 of the control unit 121 checks a free area of the region 141 in the storage unit 122 in Step S101. In Step S102, the acquisition unit 131 acquires the code stream corresponding to the checked free area from the personal computer 101.

In Step S103, the analysis unit 132 analyzes the acquired code stream to specify the head of a line in the video. In Step S104, the dividing position determination unit 133 determines a unit of division of the code stream based on the analyzed result.

More specifically, the dividing position determination unit 133 calculates the number of lines in which the data amount will be an integral multiple of the burst boundary of the storage unit 122 and determines the dividing position of the code stream using the number as the unit of division.

The dividing position determination unit 133 determines the dividing position in each line. The size of the macro block in the vertical direction is 16-pixel, therefore, the analysis unit 132 actually determines the dividing position in the unit of 16 lines.

Commonly, a DRAM such as a DIMM (Dual Inline Memory Module) is used for the storage unit 122 storing picture data as decoded results based on the size of the original video, however, it takes time for transferring data unless input/output to and from the DRAM is performed by the burst transfer. That is, the latency (delay time) of data input/output is increased.

When the unit of reading/writing data (data amount) with respect to the storage unit 122 does not correspond to the burst boundary of the storage unit 122, there is a fear that the inside of the same burst boundary is overwritten at the next writing, therefore, it is difficult to perform burst access and the latency is likely to be increased. A realization circuit is likely to be complex and expensive.

That is, in order to suppress the increase of latency and the increase of costs, it is desirable that reading/writing with respect to the storage unit 122 is performed by each unit corresponding to the burst boundary of the storage unit 122. The picture data outputted from plural decoding processing execution units is temporarily stored in the storage unit 122. More specifically, the decoding control unit 135 and the transfer unit 136 reads/writes picture data in the unit of division.

Therefore, the dividing position determination unit 133 determines a dividing position so that the data amount of the picture data in the unit of division corresponds to the burst boundary of the storage unit 122.

For example, assume that the storage unit 122 has 16-burst and the sum of the data bit width is 128-bit. The burst boundary will be 128[bit]/8×16=256[byte].

Also, assume that video of picture data obtained as the decoded result is, for example, video having a picture horizontal size of 2048 [pixel], YCbCr=4:4:4 format and 10-bit gray scale.

In this case, the video has YCbCr=4:4:4 format as well as 10-bit gray scale, therefore, each 10[bit] of YCbCr is stored in 4[byte]. Therefore, the data amount in one line will be 2048 [pixel]×4[byte/pixel]=7680[byte], which is an integral multiple of the burst boundary 256[byte]. Therefore, in this case, the dividing position determination unit 133 can determine 16 lines as the unit of division. In other words, since the dividing position determination unit 133 determines 16 lines as a unit of division, thereby allowing all accesses to the storage unit 122 by the decoding control unit 135 and the transfer unit 136 to be the burst access.

On the other hand, assume that video of picture data obtained as the decoded result is, for example, video having the picture horizontal size of 2048 [pixel], YCbCr=4:2:2 format and 10-bit gray scale.

In this case, the video has YCbCr=4:2:2 format as well as 10-bit gray scale, therefore, the sum of YCbCr 20[bit]×3 [pixel] are stored in 8[byte]. Therefore, the data amount in one line will be 2048 [pixel]×8[byte/pixel]=16384[byte]/3 [byte], which is not an integral multiple of the burst boundary 256[byte]. In this case, the data amount of 16 lines will not be an integral multiple of the burst boundary either. Therefore, it is difficult to allow all accesses to the storage unit 122 by the decoding control unit 135 and the transfer unit 136 to be the burst access by determining 16 lines as a unit of division by the dividing position determination unit 133, which may increase the latency.

However, for example, the data amount of 144 lines will be 16384/3×144[byte]=786432[byte] because of 144=48×3, which is an integral multiple of the burst boundary 256[byte]. That is, all accesses to the storage unit 122 by the decoding control unit 135 and the transfer unit 136 can be the burst access.

In this case, the dividing position determination unit 133 can determines 48 (16×3) lines as a unit of division and can determine 96 (32×3) lines as a unit of division. Further, the dividing position determination unit 133 can determines 192 (64×3) lines as a unit of division.

When the dividing position (unit of division) is determined as described above, the process proceeds to Step S105.

In Step S105, the storage unit 122 acquires and stores the code stream supplied from the analysis unit 132.

As described above, the analysis unit 132 analyzes the code stream while storing the stream (during transmission) in the storage unit 122. The dividing position determination unit 133 determines the dividing position as soon as obtaining necessary information. That is, it is possible to execute respective processing from Step S103 to Step S105 in parallel to one another. When the dividing position (unit of division) has been already determined and it is not necessary to update the position, the processing of Step S104 is omitted.

In Step S106, the dividing position determination unit 133 determines whether the code stream of the unit of division has been stored in the storage unit 122 or not based on the analysis result supplied from the analysis unit 132. When it is determined that the code stream of the unit of division has not been stored in the storage unit 122, the process returns to Step S101, and the afterward processing is repeated. When it is determined that the code stream of the unit of division has been stored in the storage unit 122 in Step S106, the process proceeds to Step S107.

In Step S107, the dividing position determination unit 133 notifies that the code stream of the unit of division has been stored to the dividing unit 134. When the notification is completed, the processing of acquiring the code stream is completed.

Next, an example of the flow of analysis processing executed in Step S103 of FIG. 3 will be explained with reference to a flowchart of FIG. 4. The explanation will be made with reference to FIG. 5 if necessary.

When the analysis processing is started, the analysis unit 132 analyzes the code stream in Step S121, acquires picture size information of the video and notifies the dividing position determination unit 133 of the information. In Step S122, the analysis unit 132 analyzes the code stream, acquires macro-block size information thereof and notifies the dividing position determination unit 133 of the information.

The code stream is divided by a unit of a horizontal line of original video, however, there does not exist a portion indicating the line such as in MPEG2 in the code stream of MPEG4 SStP. Accordingly, each line is specified by using a macro-block number (namely, the head position of the line is specified).

Figure 5:
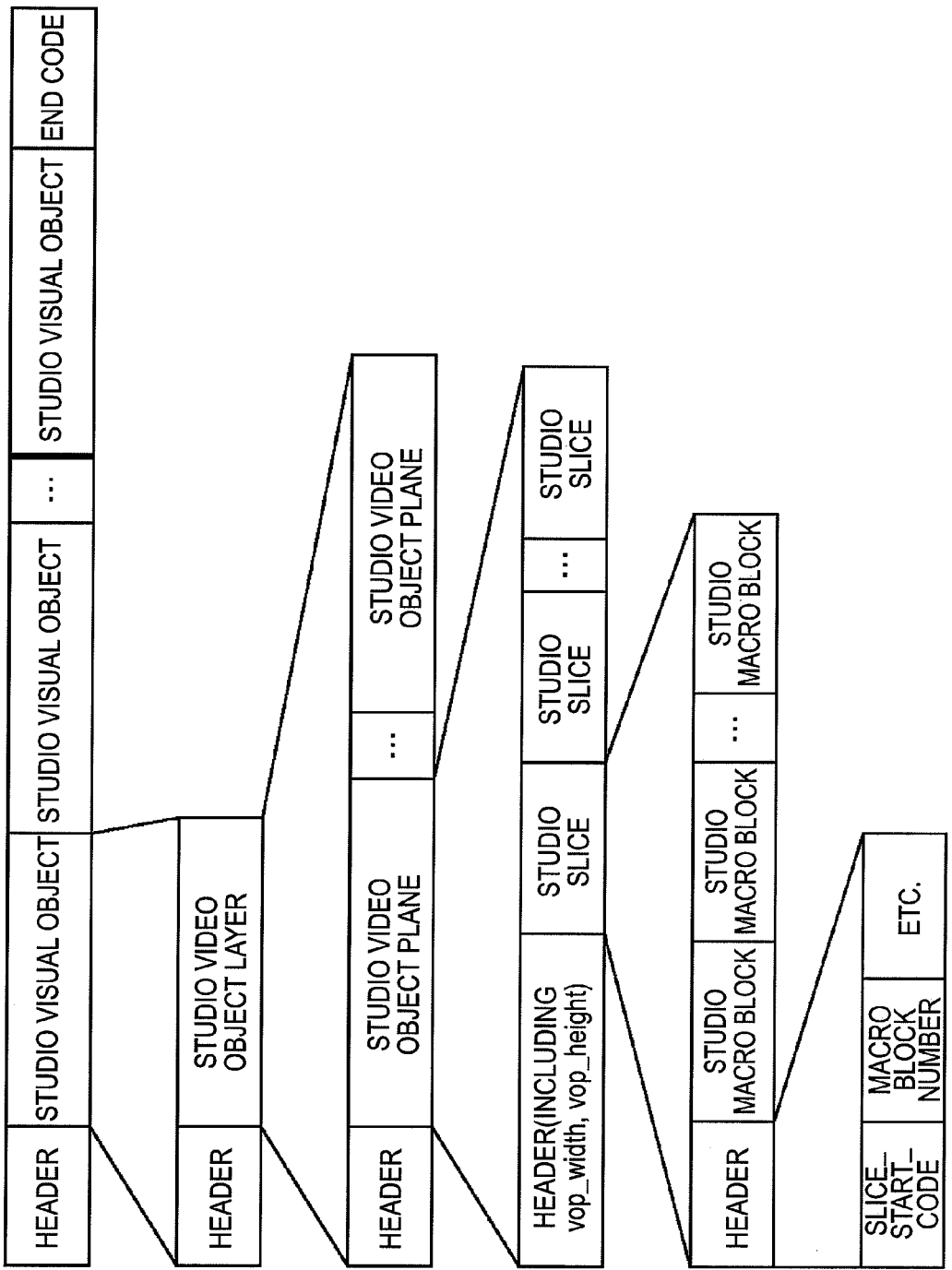
FIG. 5 is a view showing a configuration example of data.

FIG. 5 is a view showing a configuration example of the code stream. As shown in FIG. 5, the code stream (Visual Object Sequence) has a hierarchical structure, in which Studio Video Object Plane shown at the third stage from below corresponds to data of one screen.

In Studio Video Object Plane, there are head information (Header) and plural slices (Studio Slice). The head information includes information (vop_width, vop_height) indicating the picture size of video. Each slice includes header information (Header) and one or plural macro blocks (Studio Macro Block). The header information includes a slice start code (Slice_start_code) indicating the head of the slice and a macro-block number indicating an identification number of the head macro block.

Here, assume that the size of the macro block is 16[pixel]×16[pixel]. At this time, the size (the number of pixels) of one line/16 will be the number of macro blocks per one line. Naturally, this is an example and the size of the macro block is optional.

Here, assume that one line is 1920[pixel], the number of macro blocks per one line will be 1920/16=120 pieces. In MPEG4 SStP, the slice (Studio Slice) does not exceed the line, therefore, the slice the macro-block number of which is an integral multiple of 120 will be the slice at the left end of the line. Namely, the head of the slice will be the head of the line.

First, the analysis unit 132 searches the head (header information (Header)) of the slice (Studio Slice) by searching the slice start code (Slice_start_code) from the code stream in Step S123. The slice start code is a fixed value which has been determined in advance, which is (000001B7), and can be adjustable when changed to other values.

In Step S124, the analysis unit 132 determines whether the slice start code has been detected or not. When it is determined that the slice start code has not been detected, the process returns to Step S123. That is, the searching of the slice start code is continued. When it is determined that the slice start code has been detected in Step S124, the process proceeds to Step S125. The analysis unit 132 determines whether the macro-block number just after the slice start code is "picture size in the horizontal direction (vop_width)/macro-block size (for example, 16-pixel)" or not in Step S125.

When the micro-block number does not correspond to "picture size in the horizontal direction/macro-block size", the process returns to Step S123. That is, the searching of the slice start code is continued. When it is determined that the micro-block number corresponds to "picture size in the horizontal direction/macro-block size", the process proceeds to Step S126.

In Step S126, the analysis unit 132 determines that the position is the head of the line, and notifies the dividing position determination unit 133 of the position.

Figure 3:
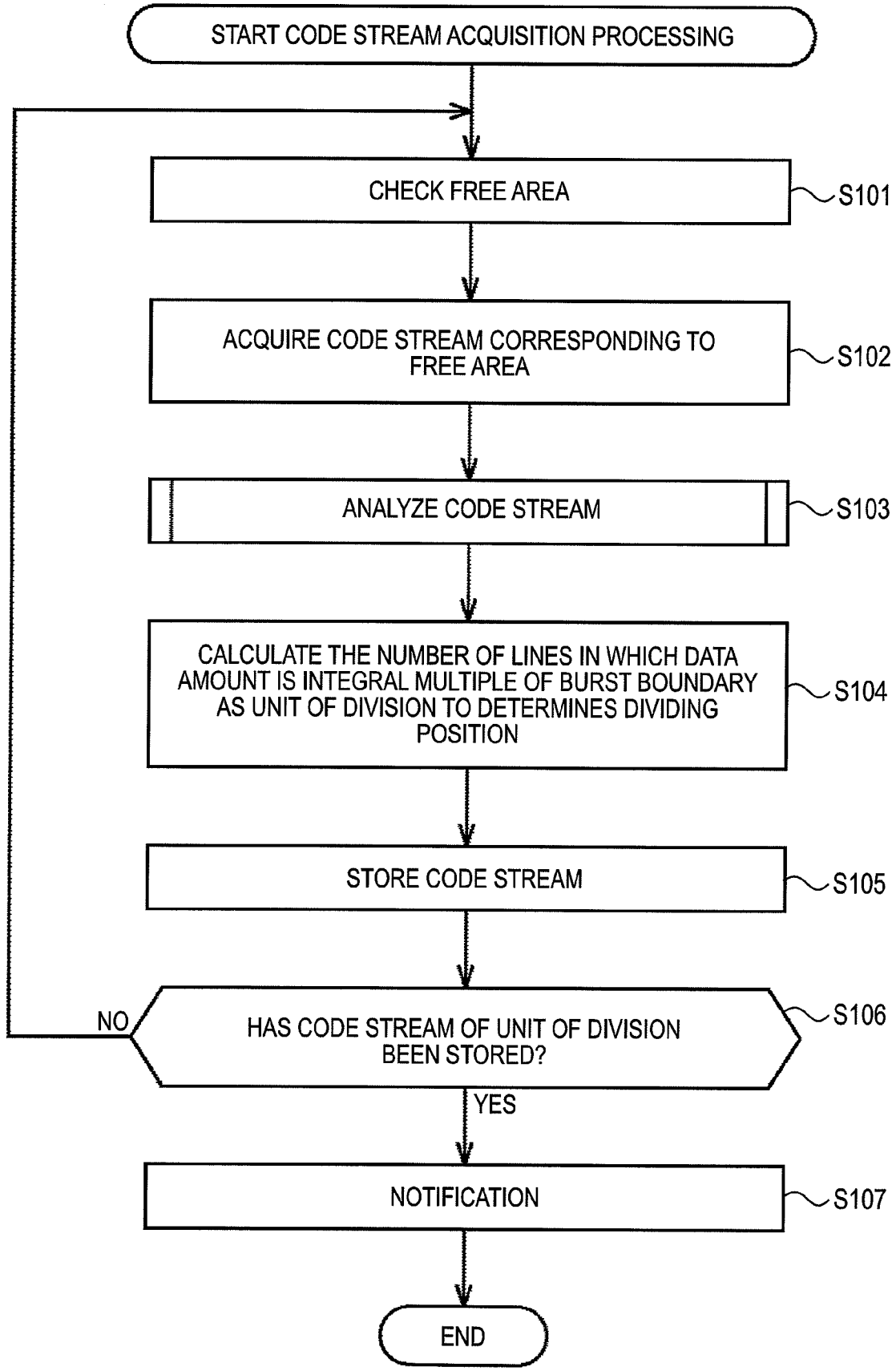
FIG. 3 is a flowchart for explaining an example of the flow of code stream acquisition processing.
Figure 4:
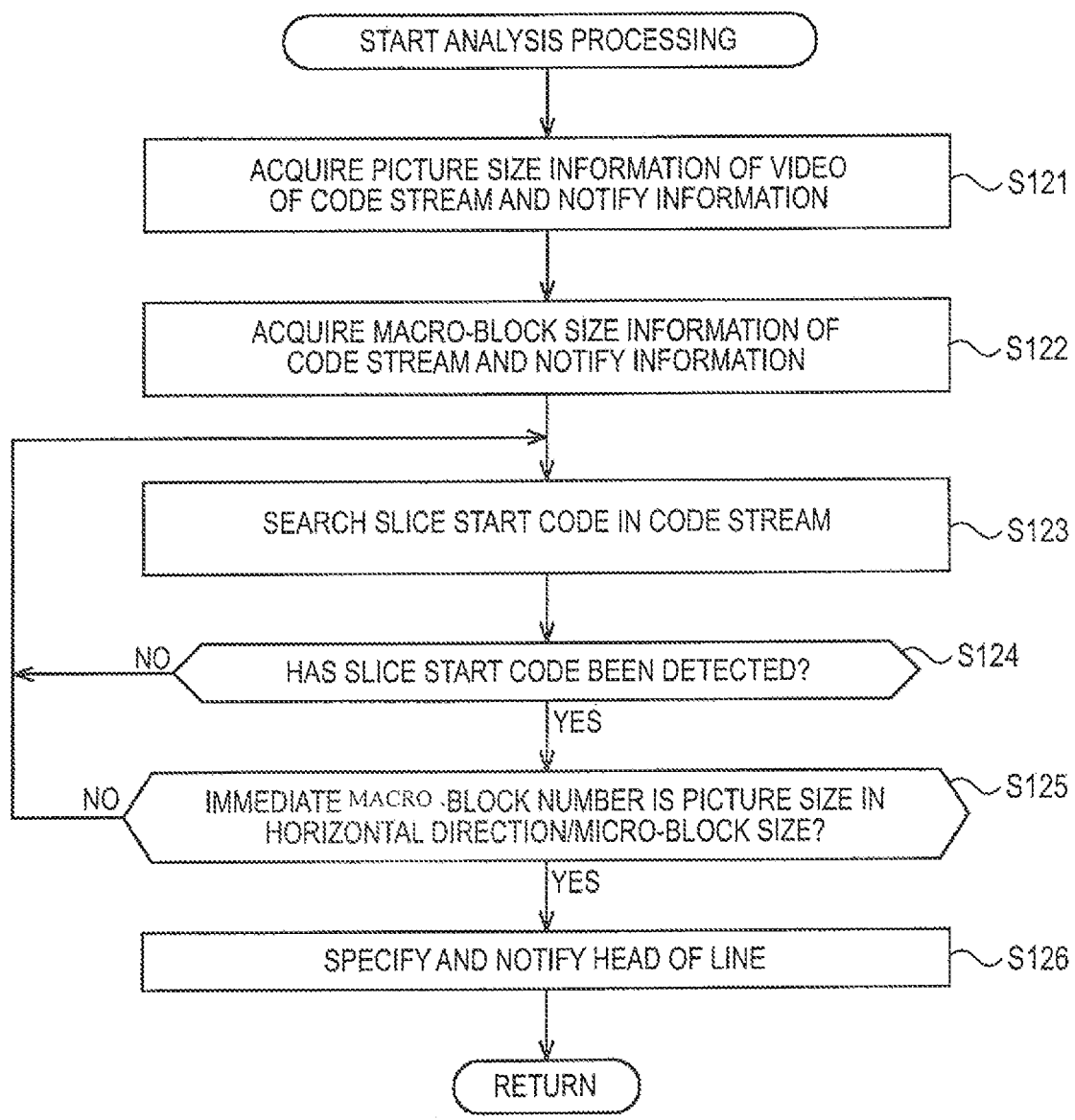
FIG. 4 is a flowchart for explaining an example of the flow of determination processing of a unit of division.

As described above, when the head position of the line is notified, the analysis processing is completed, then, the process returns to Step S103 of FIG. 3 and the processing after Step S104 is executed. That is, the dividing position determination unit 133 acquires the position information of the line head from the analysis unit 132 as the analysis result, and determines the dividing position based on the position information.

When the storage of the code stream of the unit of division is notified by the processing of Step S107 of FIG. 3, the dividing position 134 starts decoding control processing.

Figure 6:
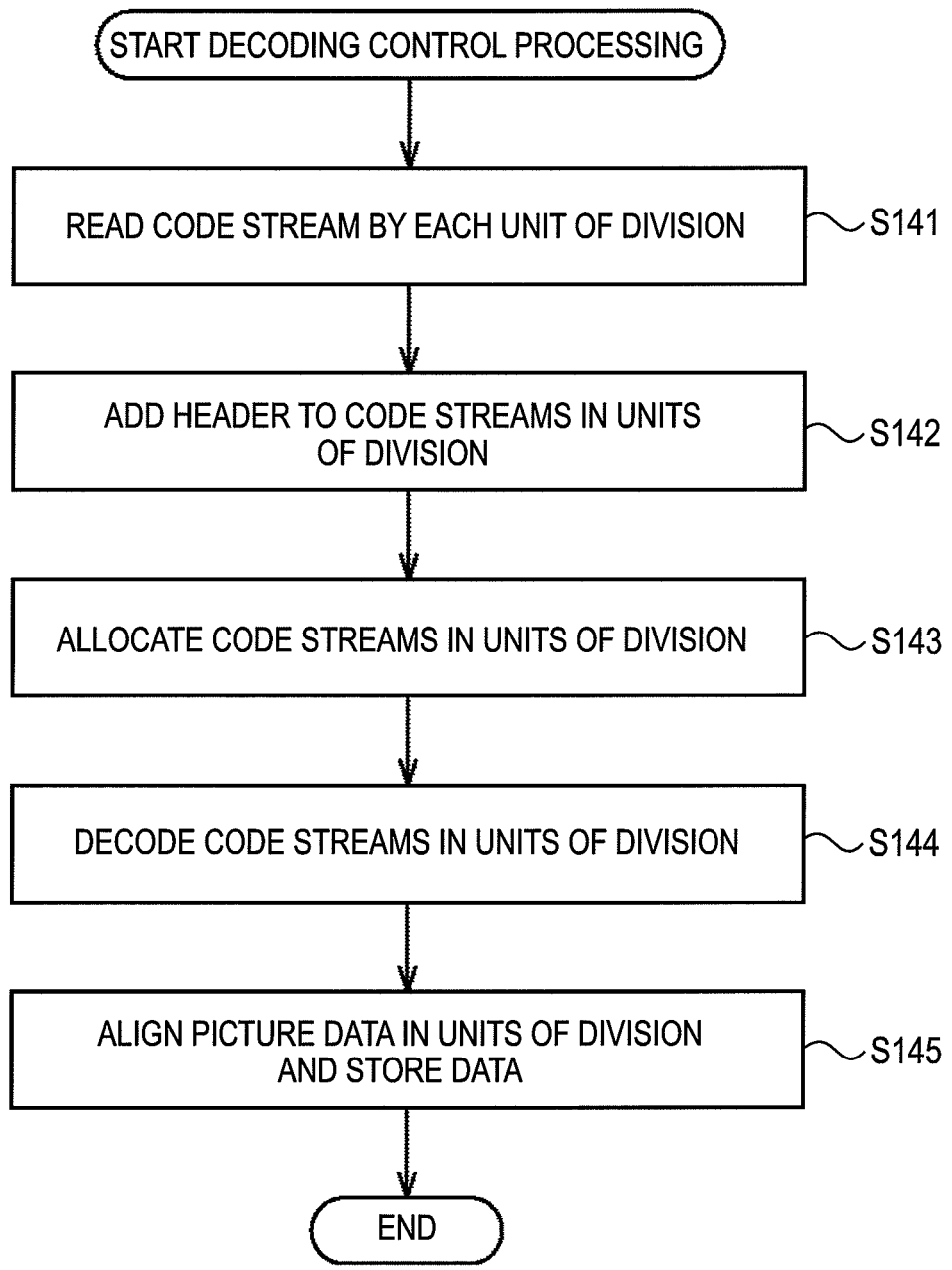
FIG. 6 is a flowchart for explaining an example of the flow of decoding control processing.

An example of the flow of decoding control processing executed by the dividing unit 134 and the decoding control unit 135 will be explained with reference to a flowchart of FIG. 6.

When the decoding control processing is started, the dividing unit 134 reads the code stream stored in the storage unit 122 by each unit of division determined by the dividing position determination unit 133 in Step S141. In Step S142, the dividing unit 134 adds head information to the read code streams in units of division. In Step S143, the decoding control unit 135 allocates code streams in units of division to the decoding processing execution units.

In Step S144, the decoding processing execution units 151 to 153 decode allocated code streams in units of division respectively. When the decoding processing is completed, the decoding processing execution units 151 to 153 return the obtained decoded results (picture data) to the decoding control unit 135, respectively. In Step S145, the decoding control unit 135 designates storage addresses in the storage unit 122 with respect to supplied picture data in respective units of division, allowing the picture data to be aligned in a predetermined order and to be stored in the storage unit 122. At this time, the decoding control unit 135 supplies picture data in units of division to the storage unit 122 by the burst transfer to be stored therein.

When the processing of Step S145 is completed, the decoding control processing is completed.

Figure 7:
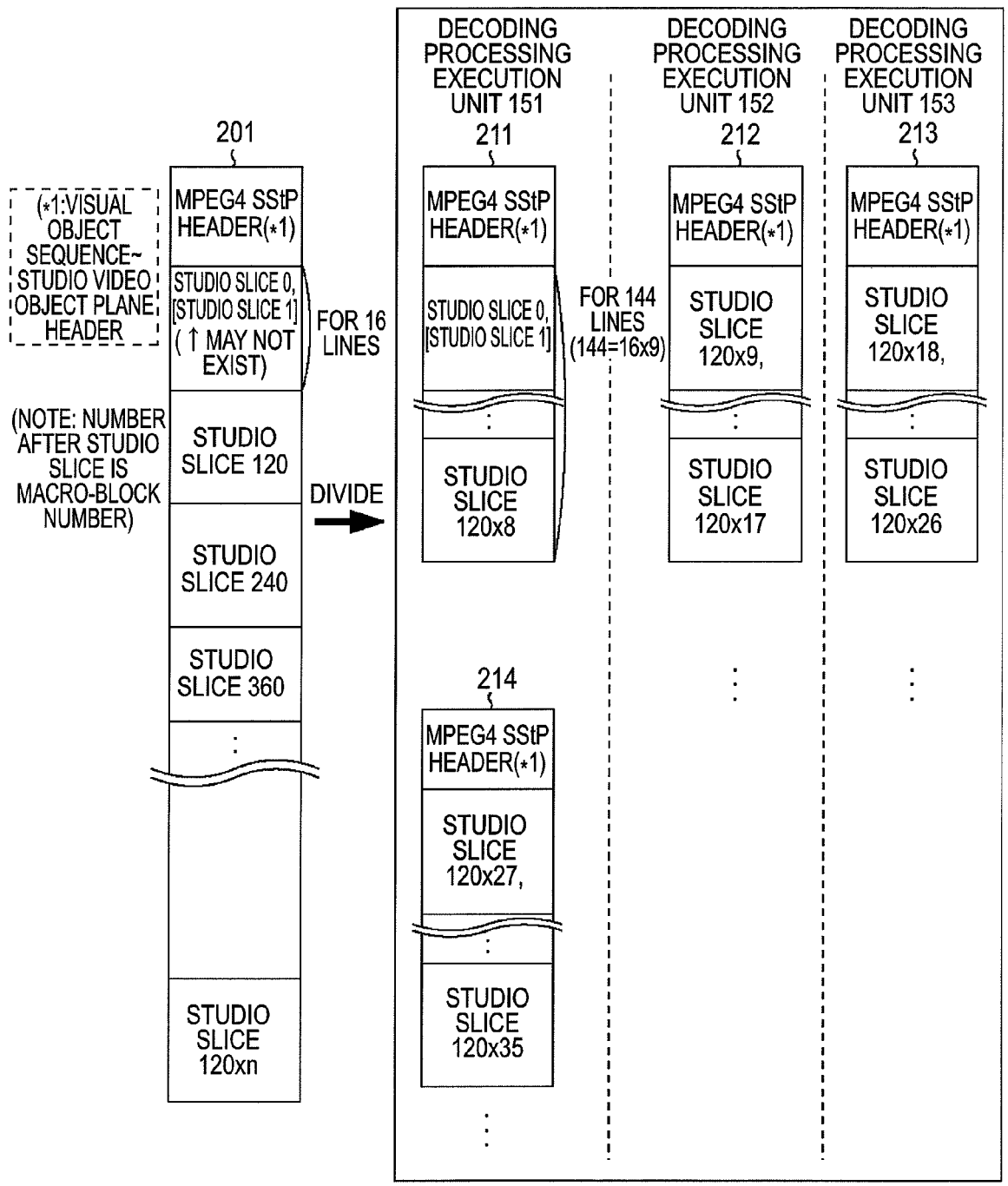
FIG. 7 is a view for explaining an example of a dividing manner.

FIG. 7 is a view for explaining an example of a dividing manner. As shown in FIG. 7, a code stream 201 for one frame is divided at dividing positions corresponding to burst boundaries as described above. FIG. 7 corresponds to the above calculation example, and the code stream 201 is divided by using 144 lines as a unit of division.

All header information from Visual Object Sequence to Studio Video Object Plane is added to respective divided code streams in the same manner as the code stream for one frame. Then, these respective code streams to which header information is added are sequentially allocated to any of the decoding processing execution units 151 to 153, respectively.

In the case of FIG. 7, a first code stream 211 is allocated to the decoding processing execution unit 151, a next code stream 212 is allocated to the decoding processing execution unit 152 and a further next code stream 213 is allocated to the decoding processing execution unit 153. Additionally, a further next code stream 214 is allocated to the decoding processing execution unit 151 again. Accordingly, respective code streams are sequentially allocated to the decoding processing execution units 151 to 153 in the predetermined order.

Therefore, the decoding processing execution units 151 to 153 deal with the supplied code streams as Visual Object Sequences respectively and performs decoding processing to them.

The control unit 121 can decode the code streams with lower latency by executing the above decoding control processing.

The transfer unit 136 executes transfer processing in parallel to the above respective processing, transferring picture data stored in the storage unit 122 to the personal computer 101.

Figure 8:
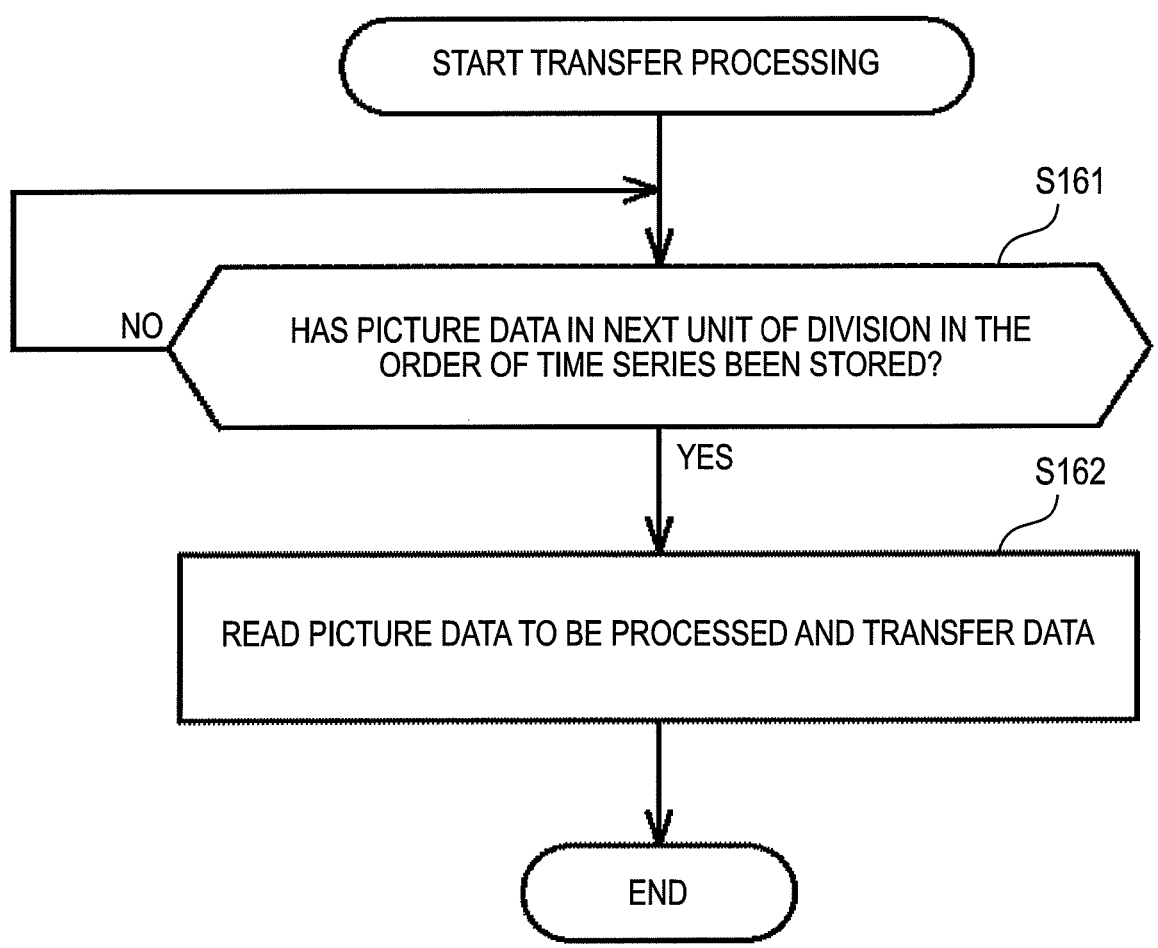
FIG. 8 is a flowchart for explaining an example of the flow of transfer processing.

An example of the flow of transfer processing will be explained with reference to a flowchart of FIG. 8.

When the transfer processing is started, the transfer unit 136 determines whether picture data in the next unit of division in the order of time series (picture data to be transferred next) has been stored in the storage unit 122 or not in Step S161, and waits until determined that the data has stored. When it is determined that picture data to be transferred next has been stored, the process proceeds to Step S162.

In Step S162, the transfer unit 136 reads picture data to be processed, namely, picture data to be transferred next from the storage unit 122 and transfers the data to the personal computer 101. At this time, the transfer unit 136 reads picture data from the storage unit 122 by the burst transfer.

When the transfer is completed, the transfer processing is completed. When the transfer processing is completed, the transfer processing is newly executed again. The transfer processing is repeatedly executed until the supply of code streams from the personal computer 101 is stopped.

According to the above processing, the transfer unit 136 can sequentially provide picture data stored in the storage unit 122 to the personal computer.

Figure 9:
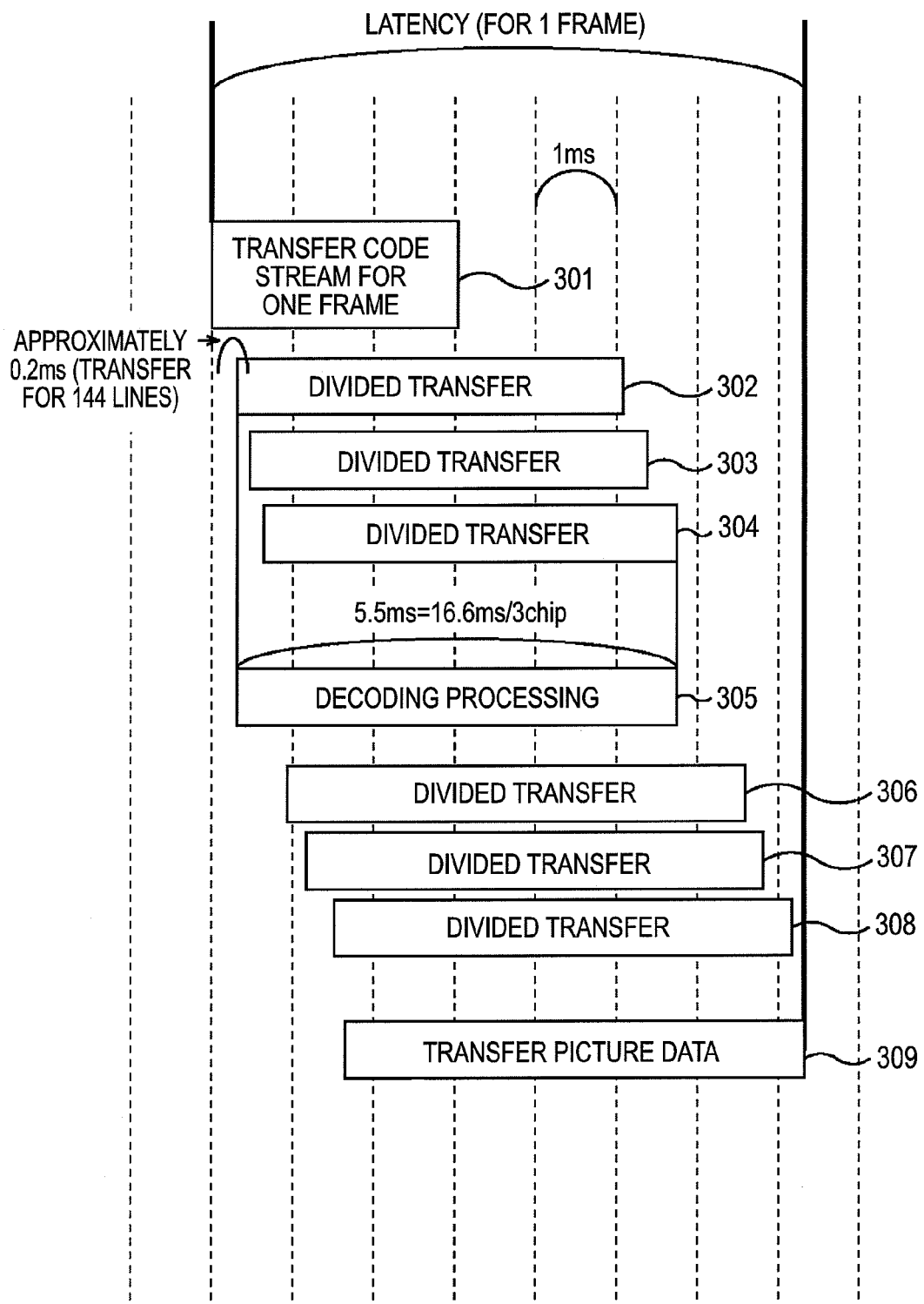
FIG. 9 is a view for explaining an example of a state of delay.

FIG. 9 is a view for explaining an example of a state of delay in data processing for one frame.

FIG. 9 shows an example of the state of delay when original video is progressive video having a picture size of 1920 [pixel]×1080[pixel], a YCbCr=4:2:2 format, a 10-bit gray scale and a frame rate of 30[fps].

The decoding processing execution units 151 to 153 include a decoding ability of a progressive system of 60[fps], and a PCI Express x8 is used for a bus 103 with respect to the personal computer 101. In this case, respective processing of a code stream transfer 301 for one frame from the personal computer 101 to the decoding processing unit 102, divided transfers 302 to 304 of a code stream from the storage unit 122 to the decoding unit 123, a decoding processing 305, divided transfers 306 to 308 of picture data from the decoding unit 123 to the storage unit 122 and a picture data transfer 309 from the decoding processing unit 102 to the personal computer 101 are executed as shown in FIG. 9. That is, one frame can be decoded with low latency at approximately 7[ms].

When the number of decoding processing execution processing units is increased, the latency can be further suppressed. For example, in the case where the six decoding processing execution units are used and the bus 103 such as a bus the band of which is adjusted (PCI Express x16) is used, the latency will be approximately 3.5[ms].

The case where only one frame is decoded has been explained as the above, however, the decoding processing unit 102 of the information processing system 100 can easily realize the decoding of the original video at n-times speed, for example, 6-times speed of actual time of the original video by using an application having an interface as an pipeline in which streams are continuously supplied from the computer.

As described above, a plural number of decoding processing execution units having the MPEG4 SStP format which is a general-purpose encoding/decoding format are used, the stream is parsed by using a scheme of the MPEG4 SStP stream and divided into plural streams to perform decode control, thereby performing decoding processing with low latency.

It is also perform decoding with low latency as well as at higher speed than real time such as n-times of actual time by using the above scheme.

2. Second Embodiment

[Personal Computer]

The above series of processing can be executed by hardware as well as software. In this case, it is preferable to configure the apparatus as a personal computer shown in FIG. 10.

In FIG. 10, a CPU 401 of a personal computer 400 executes various processing in accordance with programs stored in a ROM (Read Only Memory) 402, or programs loaded from a storage unit 413 to a RAM (Random Access Memory) 403. The RAM 403 also stores data necessary for executing various processing by the CPU 401 appropriately.

The CPU 401, the ROM 402 and the RAM 403 are connected to one another through a bus 404. An input/output interface 410 is also connected to the bus 404.

To the input/output interface 410, an input unit 411 including a keyboard, a mouse and the like, an output unit 412 including display such as a CRT (Cathode Ray Tube) and an LCD (Liquid Crystal Display), the speaker and so on, a storage unit 413 including a hard disc and the like and a communication unit 414 including a modem and the like are connected. The communication unit 414 performs communication processing through networks including Internet.

A drive 415 is also connected to the input/output interface 410 if necessary, on which removable media 421 such as a magnetic disc, an optical disc, a magnet-optical disc or a semiconductor memory are suitably mounted, and computer programs read from them are installed to the storage unit 413 according to need.

In the case where the above series of processing is executed by software, programs included in the software are installed from networks or storage media.

The recording media includes not only the removable media 421 including a magnetic disc (including a flexible disc), an optical disc (including CD-ROM (Compact Disc-Read Only Memory) and a DVD (Digital Versatile Disc)), a magnet-optical disc (including a MD (Mini Disc)) or a semiconductor memory to which programs are recorded, which are distributed to the user for delivering programs in a manner separated from the apparatus body, for example, as shown in FIG. 10, but also the ROM 402, the hard disc included in the storage unit 413 and the like, to which programs are recorded, which is delivered to the user in a state of being incorporated with the apparatus body.

The programs executed by the computer may be programs to be processed in time series along the order explained in the present specification or may be programs to be processed in parallel or at necessary timings such as when calling is performed.

Additionally, in the specification, steps describing programs recorded in the recording media includes not only processing performed in time series along the described order but also processing executed in parallel or individually though it is not always processed in time series.

Also in the specification, the system indicates the entire apparatus including plural devices.

In the above description, the configuration which has been explained as one device (or one processing unit) may be divided to be used as plural devices (or processing units). On the other hand, configurations explained as plural devices (or processing units) may be integrated to be used as one device (or one processing unit). Naturally, it is also preferable that configurations other than the above-described configurations are added to the configurations of respective devices (or respective processing units). Furthermore, part of the configuration of a certain device (or a processing unit) may be included in the configuration of another device (or another processing unit) as long as the configuration and operation as the entire system are substantially the same. That is, embodiments of the invention are not limited to the above embodiments and can be variously modified within a scope not departing from the gist of the invention.

The present application contains subject matter related to that disclosed in Japanese Priority Patent Application JP 2009-127244 filed in the Japan Patent Office on May 27, 2009, the entire contents of which is hereby incorporated by reference.

What is claimed is:

1. An information processing apparatus for decoding comprising:
   an analysis means for analyzing a code stream, in which picture data is encoded, during transmission, wherein the picture data not having a portion indicating a start of a line, and the analysis means determines a head position of a line in the picture data based on analyzed sizes of video and macro block of the code stream;
   a dividing position determination means for calculating a number of lines in which an amount of picture data is an integral multiple of a burst boundary of a storage means, for determining a dividing position of the code stream to form plural streams in accordance with the calculated number of lines as a unit of division and for adding header information to the code stream in the unit of division, wherein the dividing position determination means determines the dividing position corresponding to the burst boundary of the storage means;
   a decoding means for decoding the plural streams in parallel, which are obtained by the code stream being divided at the dividing position determined by the dividing position determination means, wherein timings of start and end of each parallel decoding processing do not always correspond to one another;
   an acquisition means for acquiring the code stream;
   said storage means for storing the code stream acquired by the acquisition means, wherein the analysis means analyzes the code stream acquired by the acquisition means while storing the code stream in the storage means;
   a control means for supplying results of decoding processing by the decoding means to the storage means by a burst transfer to be stored therein; and
   an output means for reading the results of decoding processing stored by the storage means from the storage means by the burst transfer and outputting the results.

2. The information processing apparatus according to claim 1,
   wherein the analysis means specifies one line of video in the picture data by analyzing the code stream, and
   the dividing position determination means determines the dividing position by using one line or plural lines of video in the picture data as a unit.

3. The information processing apparatus according to claim 2,
wherein the analysis means detects a slice start code of the code stream, and specifies one line by searching a macro block at the head of the line based on a macro-block number just after the slice start code, and
the dividing position determination means determines the dividing position based on the number of macro-block lines.

4. The information processing apparatus according to claim 1,
wherein the picture data is encoded in accordance with a standard of MPEG4 Simple Studio Profile.

5. An information processing apparatus for decoding comprising:
a storage unit for temporarily storing a code stream in which picture data is encoded;
an analysis means for analyzing the code stream while storing the code stream in the storage unit, wherein the picture data not having a portion indicating a start of a line, and the analysis means determines a head position of a line in the picture data based on analyzed sizes of video and macro block of the code stream;
a determination means for calculating a number of lines in which an amount of picture data is an integral multiple of a burst boundary of the storage unit, for determining a dividing position of the code stream to form plural streams based on the calculated number of lines as a unit of division and for adding header information to the code stream in the unit of division, wherein the determination means determines the dividing position corresponding to the burst boundary of the storage unit;
plural decoding means for decoding the plural streams in parallel, which are obtained by dividing the code stream at the dividing position determined by the determination means, wherein timings of start and end of each parallel decoding processing do not always correspond to one another;
an acquisition means for acquiring the code stream;
said storage unit for storing the code stream acquired by the acquisition means, wherein the analysis means analyzes the code stream acquired by the acquisition means while storing the code stream in the storage unit;
a control means for supplying results of decoding processing by the decoding means to the storage unit by a burst transfer to be stored therein; and
an output means for reading the results of decoding processing stored by the storage unit from the storage unit by the burst transfer and outputting the results.

6. An information processing method for decoding comprising the steps of:
analyzing a code stream, in which picture data is encoded, by an analysis means during transmission, wherein the picture data not having a portion indicating a start of a line, and the analysis means determines a head position of a line in the picture data based on analyzed sizes of video and macro block of the code stream;
calculating a number of lines in which an amount of picture data is an integral multiple of a burst boundary of a storage means;
determining a dividing position of the code stream to form plural streams in accordance with the calculated number of lines as a unit of division, wherein the dividing position corresponds to the burst boundary of the storage means;
adding header information to the code stream in the unit of division; decoding the plural streams in parallel, which are obtained by the code stream being divided at the dividing position determined by a decoding means, wherein timings of start and end of each parallel decoding processing do not always correspond to one another;
acquiring the code stream;
storing the acquired code stream, wherein the analyzing of the code stream acquired is performed while storing the code stream in the storage means;
supplying results of the decoding process to the storage means by a burst transfer to be stored therein;
reading the results of the decoding processing stored by the storage means by the burst transfer; and
outputting the results.

7. An information processing apparatus for decoding comprising:
an analysis unit configured to analyze a code stream, in which picture data is encoded, during transmission, wherein the picture data not having a portion indicating a start of a line, and the analysis unit determines a head position of a line in the picture data based on analyzed sizes of video and macro block of the code stream;
a dividing position determination unit configured to calculate a number of line in which an amount of picture data is an integral multiple of a burst boundary of a storage means, to determine a dividing position of the code stream to form plural streams in accordance with the calculated number of lines as a unit of division and to add header information to the code stream in the unit of division, wherein the dividing position determination unit determines the dividing position corresponding to the burst boundary of the storage means;
a decoding unit configured to decode the plural streams in parallel, which are obtained by the code stream being divided at the dividing position determined by the dividing position determination unit. wherein timings of start and end of each parallel decoding processing do not always correspond to one another;
an acquisition unit configured to acquire the code stream;
said storage means for storing the code stream acquired by the acquisition unit, wherein the analysis unit analyzes the code stream acquired by the acquisition unit while storing the code stream in the storage means;
a control unit configured to supply results of decoding processing by the decoding unit to the storage means by a burst transfer to be stored therein; and
an output unit configured to read the results of decoding processing stored by the storage means from the storage means by the burst transfer and outputting the results.

* * * * *